Oct. 13, 1925.
P. G. PETERSON
1,556,806
CLOTHESLINE STRETCHER AND REEL
Filed July 31, 1924
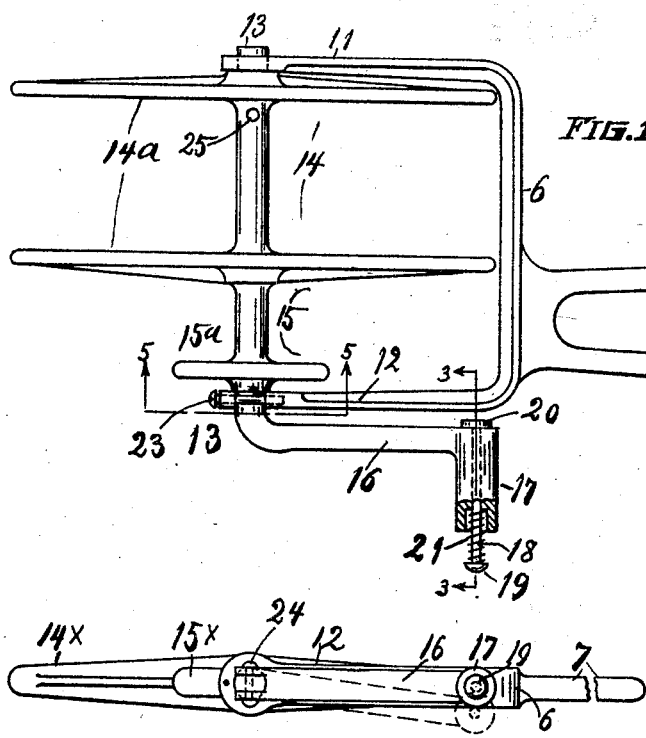
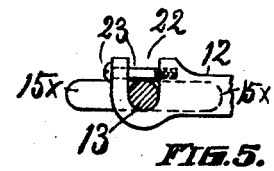
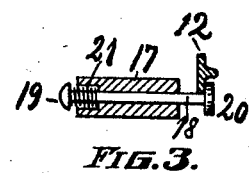
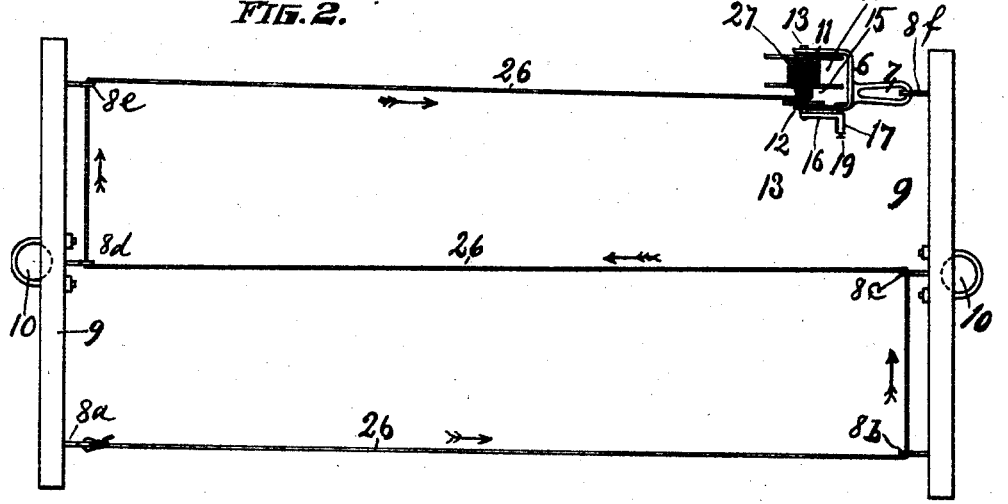
INVENTOR:
Philip G. Peterson
BY A. M. Carlsen.
ATTORNEY.

Patented Oct. 13, 1925.

1,556,806

UNITED STATES PATENT OFFICE.

PHILIP G. PETERSON, OF ST. PAUL, MINNESOTA.

CLOTHESLINE STRETCHER AND REEL.

Application filed July 31, 1924. Serial No. 729,409.

*To all whom it may concern:*

Be it known that I, PHILIP G. PETERSON, a citizen of the United States, residing at St. Paul, in the county of Ramsey and State of Minnesota, have invented certain new and useful Improvements in Clothesline Stretchers and Reels, of which the following is a specification.

My invention relates to stretching devices for clotheslines, and the object is to provide a device of said kind so improved that it may serve as a reel for the line, and when the line is put up will stretch it as desired.

In the accompanying drawing;

Fig. 1 is a top view of the device itself.

Fig. 2 is an edge view of Fig. 1 modified.

Fig. 3 is a section on the line 3—3 in Fig. 1 with the crank of the reel locked.

Fig. 4 is a top view of a pair of clothesline posts and a line stretched between them by my device.

Fig. 5 is a section on the line 5—5 in Fig. 1.

Referring to the drawing by reference numerals, 6 designates a U-shaped frame having an extension 7 serving as a handle and adapted for engagement with a clothesline hook as $8^f$ of the several hooks $8^a$, $8^b$, $8^c$ $8^d$, $8^e$ and $8^f$ secured in cross bars 9 of posts 10, or said hooks may be secured in any stationary objects.

The frame 6 has two parallel spaced arms 11 and 12 in which is journaled the shaft 13 of a reel having a large winding space 14 and a small winding space 15 between spiders $14^a$—$15^a$. The shaft is provided with a crank 16 having a hollow handle 17 in which is a slidable rod 18 having heads 19 and 20 and a spring 21 pressing the rod outwardly beyond contact with the frame arm 12. By pressing on the head 19 the head 20 will pass under the frame arm 12 and engage it whereby rotation of the reel is prevented, as in Figs. 3 and 4.

The arm 12 has a lateral gap 22 forming the journal bearing for one end of the reel shaft and is closed by a screw 23 or other suitable means. When said screw is removed the shaft 13 and its reel may be removed from the frame.

The reel or drum may have each of its spiders $14^a$—$15^a$ of any desired form from that of a disc to that of a hub with two opposite radial arms like $14^x$, $15^x$ in Fig. 2.

In Fig. 2 is shown that the crank 16 may be secured to the shaft by a rivet 24, but in building the device I may also cast the crank and shaft and even the reel members in one integral piece and the frame 6 likewise.

In the operation of the device the clothesline being secured by suitable means as at 25 in Fig. 1 is wound on the main reel 14, the free end of the line 26 is then secured to hook $8^a$ and the line thrown into the hooks $8^b$, $8^c$, $8^d$ and $8^e$ as shown in Fig. 4. The loop 7 of the frame is then placed upon the hook $8^f$ and the crank is turned until the entire line is fairly taut, whereupon the line is thrown sidewise as at 27 in Fig. 4 upon the portion 15 of the reel where the diameter is small and unoccupied by the main wound portion of the line gives the crank an extra great leverage by which the line is then stretched to any desired tightness and is secured in that position by pushing the rod 18 with its head 20 to engage the frame arm 12.

When the line is to be taken down it is simply disengaged from all the hooks and wound on the reel and the latter put away until needed again.

What I claim is:

A clothes line winding and stretching device comprising a frame adapted to be secured to a stationary object, a winding reel journaled in the frame and having at one end a crank by which to rotate it; said reel comprising a main drum for the bulk of a clothes line, and at one end of said drum a second drum adapted to receive but a few final coils of the line for stretching it with extra force.

In testimony whereof I affix my signature.

PHILIP G. PETERSON.